United States Patent
Joncour et al.

(10) Patent No.: US 12,084,167 B2
(45) Date of Patent: Sep. 10, 2024

(54) FORCE APPLICATION DEVICE FOR AN AIRCRAFT CONTROL COLUMN AND METHOD FOR USING SUCH A CONTROL COLUMN

(71) Applicant: SAFRAN ELECTRONICS & DEFENSE, Boulogne-Billancourt (FR)

(72) Inventors: Yvon Joncour, Moissy-Cramayel (FR); Rémi-Louis Lawniczak, Moissy-Cramayel (FR); Philippe Bezivin, Moissy-Cramayel (FR); Clément Guillon, Moissy-Cramayel (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 182 days.

(21) Appl. No.: 17/757,625

(22) PCT Filed: Nov. 30, 2020

(86) PCT No.: PCT/EP2020/083962
§ 371 (c)(1),
(2) Date: Jun. 17, 2022

(87) PCT Pub. No.: WO2021/121939
PCT Pub. Date: Jun. 24, 2021

(65) Prior Publication Data
US 2023/0028481 A1 Jan. 26, 2023

(30) Foreign Application Priority Data
Dec. 20, 2019 (FR) ...................................... 1915211

(51) Int. Cl.
*G06F 3/033* (2013.01)
*B64C 13/04* (2006.01)
*G05G 9/047* (2006.01)

(52) U.S. Cl.
CPC ......... *B64C 13/0421* (2018.01); *G05G 9/047* (2013.01); *G05G 2009/04766* (2013.01)

(58) Field of Classification Search
CPC .... B64C 13/0421; B64C 13/10; G05G 9/047; G05G 2009/04766
(Continued)

(56) References Cited

U.S. PATENT DOCUMENTS 5,059,882 A 10/1991 Marcillat et al.
5,929,846 A 7/1999 Rosenberg et al.
(Continued)

FOREIGN PATENT DOCUMENTS

EP 2081822 A2 7/2009
FR 3011815 A1 4/2015

OTHER PUBLICATIONS

Search Report from the French Intellectual Property Office on corresponding FR application (FR1915211) dated Aug. 13, 2020.
(Continued)

*Primary Examiner* — Thuy N Pardo
(74) *Attorney, Agent, or Firm* — Alumen IP Law PC (57) ABSTRACT

The invention relates to a force application device for an aircraft control column, the control column comprising a control lever configured to rotate a first shaft and a second shaft, the force application device comprising a first force feedback member configured to exert a resistive force opposing the rotation of the first shaft, a second force feedback member configured to exert a resistive force opposing the rotation of the second shaft and a common braking device comprising a housing, a first braking member and a second braking member which are coaxial and mounted rotatably inside the housing and configured to engage with the first shaft and the second shaft, respectively, so as to brake them, preferably simultaneously.

20 Claims, 8 Drawing Sheets

(58) Field of Classification Search
USPC .................................... 345/156, 161, 174
See application file for complete search history.

(56) References Cited

U.S. PATENT DOCUMENTS

| | | | | |
|---|---|---|---|---|
| 2003/0090460 | A1* | 5/2003 | Schena | G06F 3/0383 |
| | | | | 345/156 |
| 2006/0267932 | A1* | 11/2006 | Rosenberg | G01B 5/008 |
| | | | | 345/156 |
| 2012/0187683 | A1* | 7/2012 | Wohlleb | F03D 15/10 |
| | | | | 290/44 |
| 2014/0174245 | A1* | 6/2014 | Dubost | G05G 1/40 |
| | | | | 74/512 |
| 2015/0143686 | A1* | 5/2015 | Blacket | F16D 57/002 |
| | | | | 29/243.526 |
| 2016/0339881 | A1* | 11/2016 | Abbott | B60T 8/171 |
| 2017/0166297 | A1* | 6/2017 | Guering | B64C 13/44 |
| 2019/0286237 | A1 | 9/2019 | Eck et al. | |
| 2020/0050184 | A1* | 2/2020 | Miao | B64C 19/02 |
| 2020/0200244 | A1* | 6/2020 | Seminel | F16H 57/01 |
| 2022/0395861 | A1* | 12/2022 | Snow | G06F 3/016 |

OTHER PUBLICATIONS

International Search Report and Written Opinion on corresponding PCT application (PCT/EP2020/083962) from International Searching Authority (EPO) dated Feb. 3, 2021.
Search Report from the French Intellectual Property Office on corresponding FR application (FR1915220) dated Aug. 17, 2020.
International Search Report and Written Opinion on corresponding PCT application (PCT/EP2020/083970) from International Searching Authority (EPO) dated Feb. 2, 2021.

* cited by examiner

FORCE APPLICATION DEVICE FOR AN AIRCRAFT CONTROL COLUMN AND METHOD FOR USING SUCH A CONTROL COLUMN

TECHNICAL FIELD

The present invention relates to a control column used by the pilot in an aircraft cockpit. It relates especially to a force application device for a control column to assist the pilot.

Figure 1:
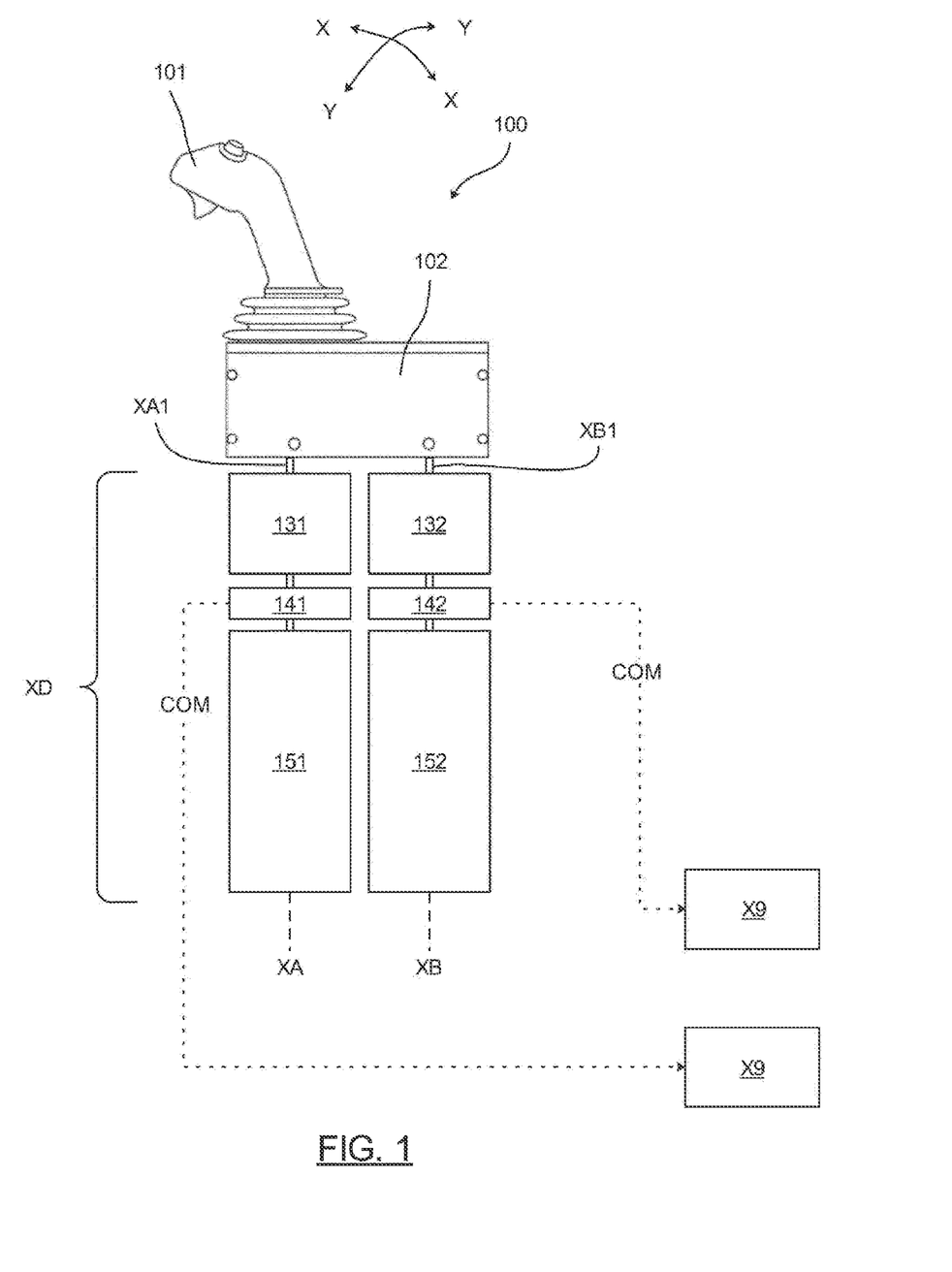
FIG. 1 is a schematic representation of a control column according to prior art.

In a known manner, with reference to [FIG. 1], a control column 100 comprises a control lever 101 rotatably mounted along a roll axis X and a pitch axis Y, these two axes X, Y being orthogonal to each other. The control column 100 transmits displacement commands COM to the aircraft's control members X9 (flaps, etc.), which are determined as a function of the position of the control lever 101 along these two axes X, Y.

In a known manner, still with reference to [FIG. 1], the control column 100 comprises a force application device XD comprising two members 131, 132 with active force feedback, also called haptic feedback, so that the pilot perceives a force feedback at the control lever 101 on each of the roll axis X and pitch axis Y. Such force feedback members 131, 132 are known to the skilled person from patent application FR 3011815A1. An active force feedback member 131, 132, in particular an electric motor, allows the force feedback to be parameterized according to a dynamic control law. An active force feedback member 131, 132 therefore opposes a passive force feedback, in particular a spring device, whose control law is a static stiffness.

In practice, the control column 100 comprises a first shaft XA1 with axis XA, mechanically connected to the rotational movements of the control lever 101 about the roll axis X, and a second shaft XB1 with axis XB, mechanically connected to the rotational movements of the control lever 101 about the pitch axis Y. The control column 100 further comprises a mechanical joint 102 connecting the shafts XA1, XB 1 to the rotational movements of the control lever 101. Such a mechanical joint 102 is known to the skilled person, in particular, from patent application FR3011815.

During the operation of the control column 100, the active force feedback members 131, 132 respectively generate a resistive force on the shafts XA1, XB 1 opposing the force exerted on the control lever 101. The flying sensations are optimally restored, which increases the safety of the flight. Preferably, angular position sensors 141, 142 are mounted on the shafts XA1, XB1 so as to indirectly determine the position of the control lever 101 along the roll axis X and pitch axis Y.

In the event of an electrical or mechanical failure in one of the force feedback members 131, 132, or in the event of a partial or total failure in the chain for processing the control signals of these force feedback members 131, 132, or in the event of a failure in the electrical power supply, the control column 100 operates in an emergency mode and the force feedback is suppressed.

In the emergency mode, in order to prevent a free control of the control lever 101, it is known to provide two braking members 151, 152 to lock the position of the control lever 101. In practice, two electrically activatable magnetorheological braking members have been provided, that act on the roll axis X and pitch axis Y of the control lever 101, respectively, by braking the shafts XA1, XB 1 as illustrated in [FIG. 1]. Such braking members 151, 152 are known from patent application FR3011815.

These braking members 151, 152 have a large overall size and mass, which is a significant drawback for the miniaturization of a control column 100.

An immediate solution to eliminate this drawback would be to miniaturize the braking members 151, 152. Nevertheless, this affects the braking performance and does not allow for optimal locking of the position of the control lever 101. Indeed, it is important that the reduction ratio, that is, the ratio of the braking force to the pilot's force, remains high so as to securely lock the position of the control lever 101 in the emergency mode.

The invention thus aims at eliminating at least some of these drawbacks by providing a new control column of limited overall size and reduced mass while allowing an efficient locking of the control lever in the emergency mode.

Incidentally, documents EP2081822A2 and US2019/286237A1 are known in prior art.

SUMMARY

The invention relates to a force application device for an aircraft control column, the control column comprising a first shaft, a second shaft and a control lever configured to rotatably drive the first shaft about a first axis and the second shaft about a second axis, the force application device comprising:

a first force feedback member configured to exert a resistive force opposing rotation of the first shaft about the first axis, and a second force feedback member configured to exert a resistive force opposing rotation of the second shaft about the second axis.

The invention is remarkable in that the force application device comprises a common braking device comprising a casing, a first braking member and a second braking member which are coaxial and rotatably mounted in the casing and configured to cooperate respectively with the first shaft and the second shaft so as to brake them, preferably simultaneously.

Advantageously, the braking members are mounted within the same braking device so as to reduce overall size and mass. Advantageously, a coaxial mounting allows the shafts to be authorized to rotate relative to each other while allowing them to be braked similarly, in particular, simultaneously in an emergency mode. The common braking device acts synergistically on the two braking elements in order to brake them together while sharing the technical means for braking. The braking performance remains optimal while the overall size is significantly reduced.

Preferably, each braking member comprises a drive portion projecting from the casing and a brake portion mounted in the casing. The brake portions thus allow for similar slowing and stopping in the common braking device.

Preferably, the common braking device comprises a first volume and a second volume in which the brake portions of the braking members are respectively mounted, each volume comprising a magnetorheological fluid whose shear strength is variable as a function of a magnetic field applied to said magnetorheological fluid. Advantageously, the magnetorheological fluid allows the two braking members to be braked similarly by using the same magnetic field, which is thus shared.

Preferably, the common braking device comprises a single magnetic source for braking the two braking members. The magnetic source is thus shared, which limits costs and reduces overall size and mass. Power consumption is also reduced.

Preferably, the braking members are rotatably mounted along a braking axis. The first volume and the second volume are axially offset from the braking axis. Thus, a coaxial mounting provides a high performance mounting by axially offsetting the brake portions.

Preferably, the braking members respectively cooperate with the shafts at a reduction ratio greater than 1. Such a reduction ratio allows for effective opposition to a user's force on the lever. In other words, the braking members reliably immobilize the lever that cannot be moved by an operator, in particular, in an emergency mode.

According to one aspect, the first braking member cooperates with the first shaft through a first gear connection. Preferably, the gear connection comprises straight or bevel teeth. According to one aspect, the second braking member cooperates with the second shaft via a second gear connection.

The use of a gear connection on one or both braking members allows the reduction ratio to be modified linearly. In this way, the diameter of the drive portions and gear wheels can be conveniently adapted to achieve the desired reduction ratio while limiting the overall size.

According to one aspect, the second braking member is rotatably integral with the second shaft. According to one aspect, the first braking member is rotatably integral with the first shaft. Such a direct connection makes it possible to limit the overall size significantly, without any additional mechanical member.

According to one aspect, the second braking member cooperates with the second shaft via a second connecting rod. Similarly, according to one aspect, the first braking member cooperates with the first shaft via a first connecting rod.

The use of a connecting rod, on one or two braking members, makes it possible to modify the reduction ratio non linearly. A connecting rod has the advantage of generating less friction and backlash than a gear connection. The diameter of the drive portions and connecting rod can be conveniently adapted to achieve the desired reduction ratio while limiting the overall size.

A combination of gear connections and connecting rods allows the reduction ratio to be freely adjustable.

According to one aspect, the drive portions of the braking members extend projecting from said casing in the same direction, in particular vertically upwards. The projecting overall size is thus confined to only one side of the casing, which allows compact integration.

According to one aspect, the drive portions of the braking members extend projecting from said casing in opposite directions. The overall size is distributed on two sides of the casing, which allows integration with a better reduction ratio. Indeed, advantage is taken of the spacing between the braking members to place a connecting member of adapted dimensions (connecting rod, gear or other) in order to adjust the reduction ratio to the desired value.

The invention also relates to an aircraft control column, the control column comprising a first shaft, a second shaft and a control lever configured to rotatably drive the first shaft about a first axis and the second shaft about the second axis, the control column comprising a force application device, as previously set forth, connected to the first shaft and the second shaft.

The invention further relates to a method for using a control column, as previously set forth, wherein, in a nominal operating mode, with the common braking device being inactive so as to allow free rotation of the first shaft and the second shaft, the method comprises a step of activating the common braking device in an emergency operating mode in which the common braking device brakes the first shaft and the second shaft, preferably simultaneously.

BRIEF DESCRIPTION OF THE DRAWINGS

The invention will be better understood upon reading the following description, given only by way of example, and referring to the appended drawings given as non-limiting examples, in which identical references are given to similar objects and in which:

[FIG. 5A]
[FIG. 5B]
[FIG. 5C]
[FIG. 5D]
[FIG. 5E]
[FIG. 5F]
[FIG. 5G]
[FIG. 5H]

It should be noted that the figures disclose the invention in detail in order to implement the invention, said figures may, of course, be used to better define the invention if necessary.

DETAILED DESCRIPTION

Figure 2:
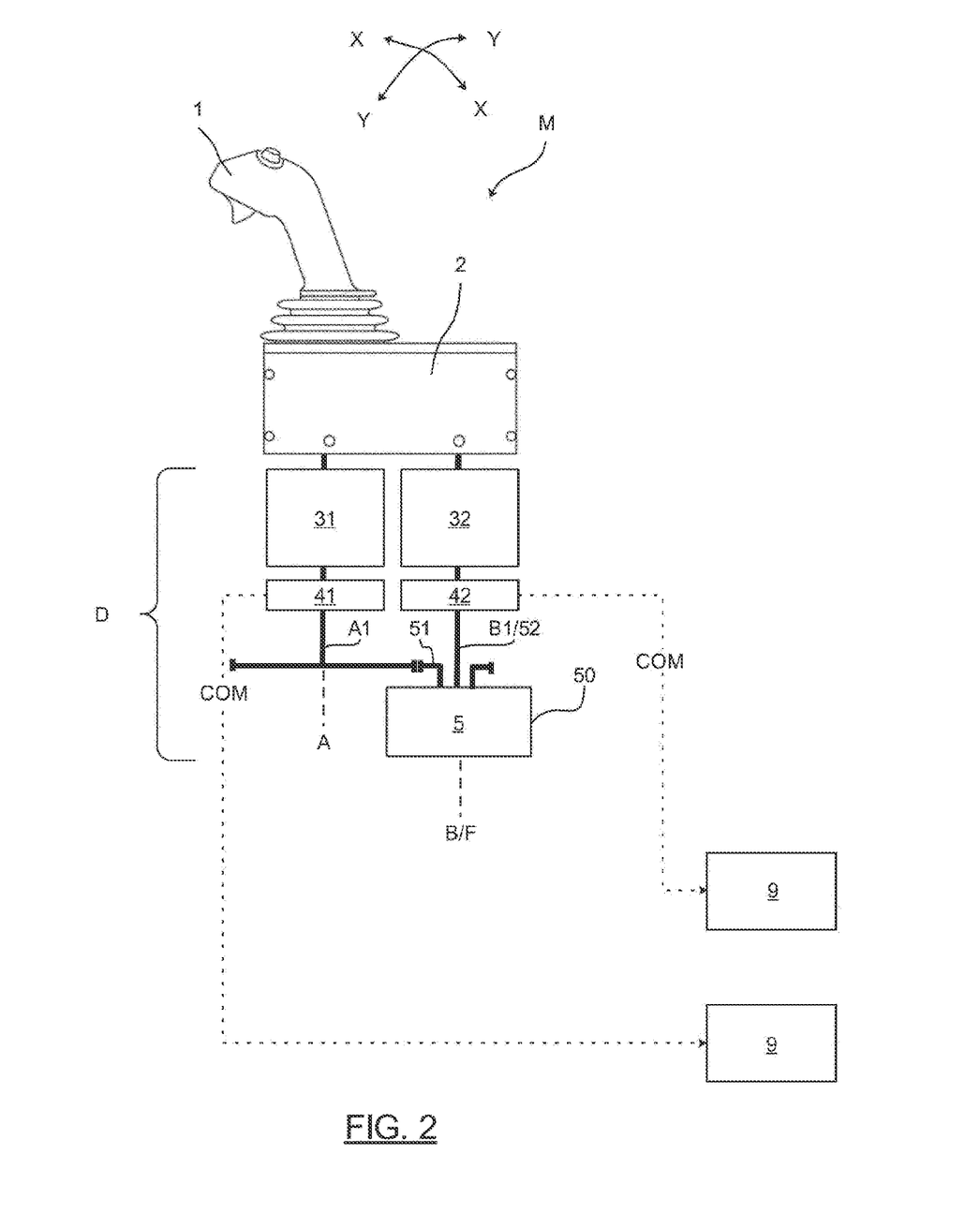
FIG. 2 is a schematic representation of a control column according to the invention comprising a common braking device.

With reference to [FIG. 2], there is represented a control column M for an aircraft which comprises a control lever 1 rotatably mounted along a roll axis X and a pitch axis Y, these two axes X, Y being orthogonal to each other. The control column M transmits displacement commands COM to the aircraft's control elements 9 (flaps, etc.), which are determined as a function of the position of the control lever 1 along these two axes X, Y. The invention relates in particular to a mini-stick located in a cockpit of the aircraft.

The control column M comprises a force application device D comprising two members 31, 32 with active force feedback, also called haptic feedback, so that the pilot perceives a force feedback at the control lever 1 on each of the roll axis X and pitch axis Y. Such force feedback members 31, 32 are known to the skilled person from patent application FR 3011815A1. An active force feedback member 31, 32, in particular an electric motor, allows the force feedback to be parameterized according to a dynamic control law. An active force feedback member 31, 32 therefore opposes a passive force feedback, in particular a spring device, whose control law is a static stiffness.

In practice, the control column M comprises a first shaft A1 with axis A, mechanically connected to the rotational movements of the control lever 1 about the roll axis X, and a second shaft B1 with axis B, mechanically connected to the rotational movements of the control lever 1 about the pitch axis Y. The control column M further comprises a mechanical joint 2 connecting the shafts A1, B1 to the rotational movements of the control lever 1. Such a mechanical joint 2 is known to the skilled person, in particular, from patent application FR3011815.

During the operation of the control column M, the active force feedback members 31, 32 respectively generate a resistive force on the shafts A1, B1 opposing the force exerted on the control lever 1. The flying sensations are optimally restored, which increases the safety of the flight. In this example, angular position sensors 41, 42 are mounted on the shafts A1, B1 so as to indirectly determine the position of the control lever 1 along the roll axis X and pitch axis Y.

In the event of an electrical or mechanical failure in one of the force feedback members 31, 32, or in the event of a partial or total failure in the chain for processing the control signals of these force feedback members 31, 32, or in the event of a failure in the electrical power supply, the control column M operates in an emergency mode and the force feedback is suppressed.

According to the invention, still with reference to [FIG. 2], the force application device D comprises a common braking device 5 comprising a casing 50, a first braking member 51 and a second braking member 52 which are coaxial and rotatably mounted in the casing 50 and configured to cooperate respectively with the first shaft A1 and the second shaft B1 in order to brake them.

Advantageously, a common braking device 5 makes it possible to reduce the overall size and mass compared to two separate devices. The use of two coaxial braking members 51, 52 makes it possible to reduce the overall size in a casing 50 while maintaining optimal braking. Indeed, the braking forces are advantageously shared between the two braking members 51, 52.

Figure 3:
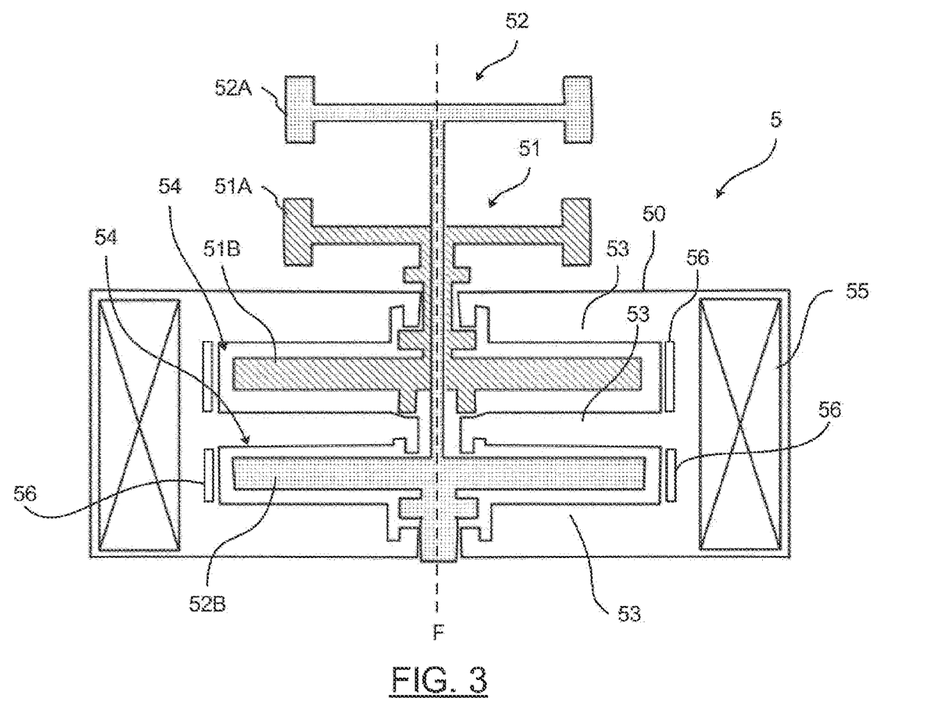
FIG. 3 is a schematic representation of an embodiment of a common braking device.
Figure 4:
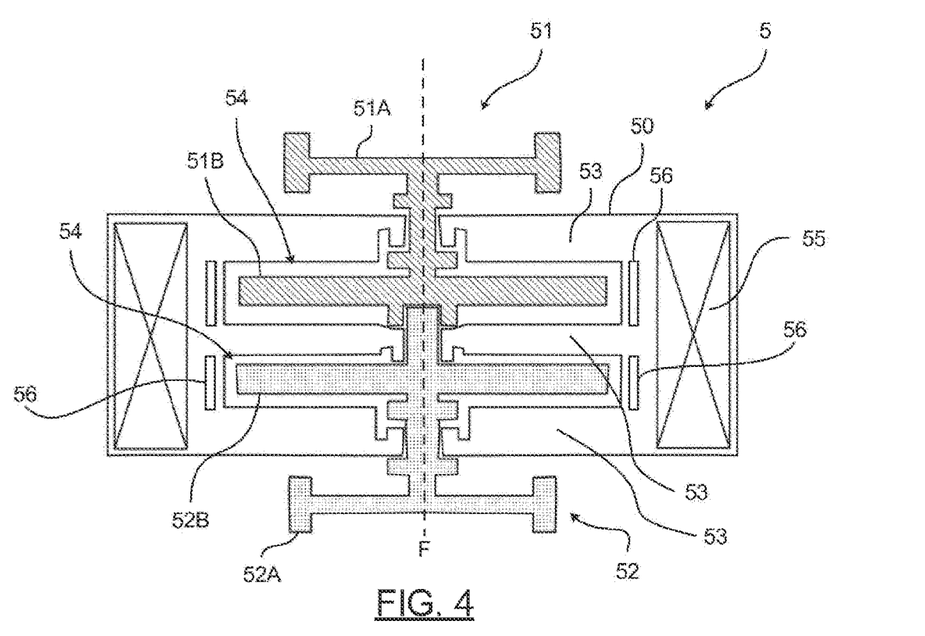
FIG. 4 is a schematic representation of an embodiment of a common braking device.

With reference to FIGS. 3 and 4, two embodiments of a common braking device 5 are represented. In these embodiments, the casing 50 forms a housing for the braking members 51, 52. In this example, the braking members 51, 52 are coaxial along a braking axis F. The common braking device 5 comprises a plurality of brake discs 53 which are spaced apart along the braking axis F so as to define between them sealed volumes 54 for receiving the braking members 51, 52 as will be set forth hereinafter. The sealed volumes 54 are filled with a magnetorheological fluid. The common braking device 5 further comprises a magnetic source 55, in particular a coil, for activating the magnetorheological fluid in the sealed volumes 54 in the emergency mode. The sealed volumes 54 are axially offset from the braking axis F.

Each braking member 51, 52 comprises a drive portion 51A, 52A and at least one brake portion 51B, 52B that is housed in a sealed volume 54. With reference to FIGS. 3 and 4, each braking member 51, 52 comprises a single brake portion 51B, 52B but of course there could be more of them to adapt the braking force.

During operation of the control column M in a nominal mode, the magnetorheological fluid in the sealed volumes 54 is in the liquid state and the braking members 51, 52 can be freely rotatably driven by the control lever 101 via the shafts A1, B1. The brake portions 51B, 52B of the braking members 51, 52 shear the magnetorheological fluid contained in the sealed volumes 54 without stress.

In the emergency mode, under the effect of a magnetic field applied by the magnetic source 55, the magnetorheological fluid is magnetized. Within the magnetorheological fluid, particles suspended in a carrier fluid (typically metal particles) align as chains of particles parallel to the field lines of the applied magnetic field. The shear strength of the magnetorheological fluid is increased under the effect of the applied magnetic field. The magnetorheological fluid thus tends to prevent rotation of the brake portions 51B, 52B of the braking members 51, 52. The resisting torque exerted by the magnetized magnetorheological fluid is much greater than the resisting torque exerted by the non-magnetized magnetorheological fluid.

According to one aspect of the invention, with reference to FIGS. 3 and 4, the braking device 5 further comprises one or more electromagnetic coils, as a magnetic source 55, configured to exert a variable magnetic field at the sealed volumes 54 of magnetorheological fluid, so as to vary the shear strength of the magnetorheological fluid as well as non-magnetic elements 56 in order to direct the field lines. For example, the coil is disposed on one side of the braking device 5, near the sealed volumes 54 containing the magnetorheological fluid. The coil 55 is typically used to simulate a damping law, during normal operation of the control column M.

An advantage of such a common braking device 5 is its small overall size. The common braking device 5 couples and decouples on command the rotational movements of the braking members 51, 52 by means of a small number of mechanical components. Such a common braking device 5 further has good resistive torque transmission performance.

The overall size is further reduced according to the invention since it integrates two coaxial braking members so as to brake them together simultaneously. The magnetic source 55 and the magnetorheological fluid are advantageously shared.

The drive portions 51A, 51B of the braking members 51, 52 extend projecting from the casing 50 so as to be able to cooperate integrally with, directly or indirectly, the shafts A1, B1.

With reference to [FIG. 3], the drive portions 51A, 51B of the braking members 51, 52 extend in the same direction with respect to the casing 50. This makes it possible to reduce the overall size. To this end, the first braking member 51 is hollow so that the second braking member 52 extends internally of the first braking member 51. With reference to [FIG. 4], the drive portions 51A, 51B of the braking members 51, 52 extend in opposite directions with respect to the casing 50. This allows the integration of members for connecting the shafts A1, B1 for adjusting the reduction ratio as will be set forth later. To this end, the braking members 51, 52 are not nested into each other but juxtaposed. Advantageously, as a function of the architecture selected for the force application device D, a common braking device 5 according to the configuration of [FIG. 3] or [FIG. 4] can be advantageously chosen.

Preferably, the common braking device 5 comprises one or more bearings to facilitate the rotation of the braking members 51, 52 in the casing 50.

Advantageously, from a control point of view, only a single braking device needs to be controlled, which provides a further synergistic advantage.

A common braking device 5 comprising two braking shafts 51, 52 has been represented, but of course it could comprise more than two. This is advantageous when the control lever 1 comprises more than two degrees of freedom.

A common braking device 5 of the magnetic type has been represented, but of course it could be of another type, for example mechanical.

Several architectures for connecting a common braking device 5 to the shafts A1, B1 will now be set forth. Such architectures make it possible to respond, on the one hand, to organizational and overall size constraints and, on the other hand, to obtain the desired reduction ratio. Indeed, it is important that the reduction ratio, that is, the ratio of the braking force to the pilot's force, remains high so as to securely lock the position of the control lever 1 in the emergency mode. The braking device 5 common to the shafts A1, B1 is configured to increase the reduction ratio so that braking is greater than the pilot's force.

In these examples, the shafts A1, B1 are vertical and parallel to each other.

Figure 5A:
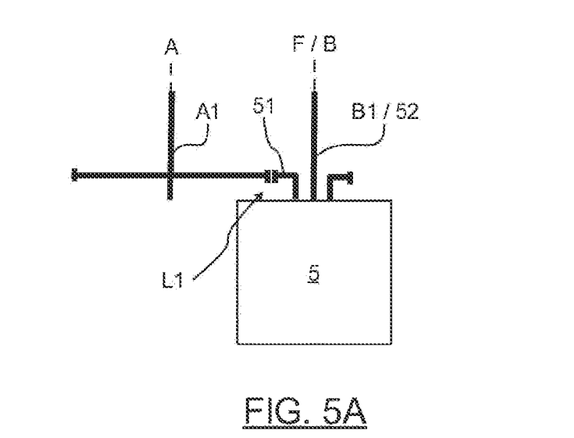

With reference to [FIG. 5A], the common braking device 5 comprises a braking axis F that is vertical and two braking members 51, 52 that extend projecting vertically upwards. The first braking member 51 is directly connected to the first shaft A1 via a first gear connection L1, while the second braking member 52 is connected integrally with the second shaft B1. The braking axis F is thus the same as the second axis B. Such an architecture has a reduced overall size and comprises a limited number of elements. The gear connection L1 advantageously makes it possible to increase the reduction ratio on the first shaft A1.

Figure 5B:
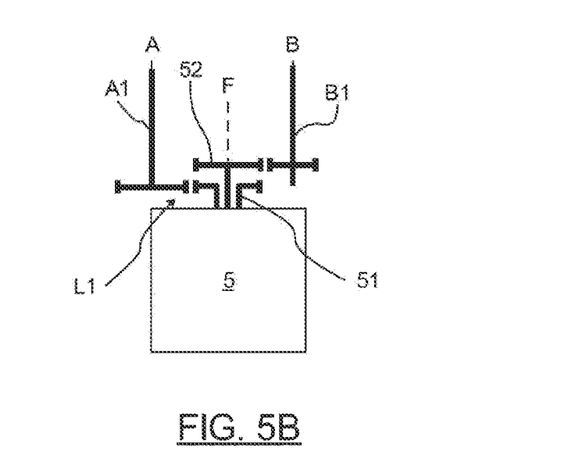
Figure 6:
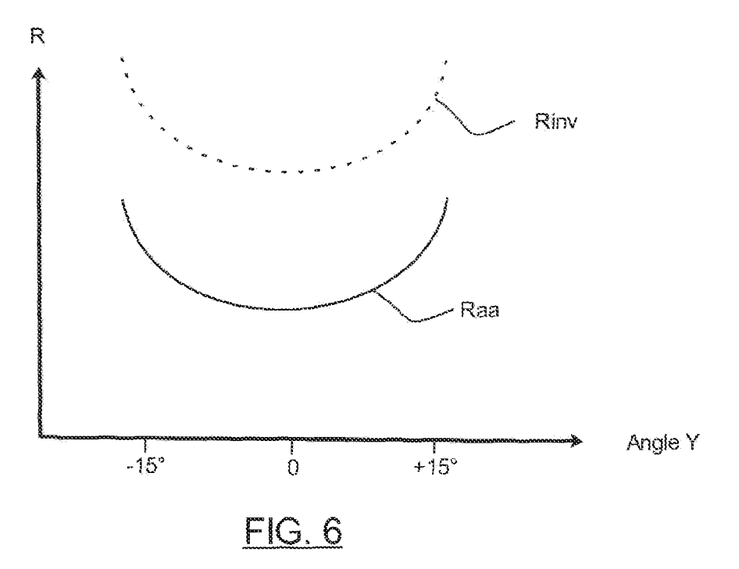
FIG. 6 are schematic curves representing the time course of the reduction ratio, for a force application device according to prior art and for the invention, when modifying the pitch angle Y.

With reference to [FIG. 5B], the common braking device 5 comprises a braking axis F that is vertical and two braking members 51, 52 that extend projecting vertically upwards. The first braking member 51 is directly connected to the first shaft A1 via a first gear connection L1. Similarly, the second braking member 52 is directly connected to the second shaft B1 via a second gear connection L2. Such an architecture has a reduced overall size and allows the two shafts A1, B1 to be braked similarly by increasing the reduction ratio. The use of gear connections L1, L2 makes it possible to increase the reduction ratio linearly. For example, with reference to [FIG. 6], by virtue of the invention, a reduction ratio Rinv is obtained which is greater than a reduction ratio Raa according to prior art on the pitch axis Y. The use of a gear connection allows the dimensions (diameter and/or width) to be reduced in proportion to the reduction ratio, which facilitates the integration of the components while reducing the mass. The overall size is advantageously reduced compared to [FIG. 5A].

Advantageously, the architecture is compact and localized between the common braking device 5 and the angular position sensors 41, 42 as illustrated in [FIG. 2].

Figure 5C:
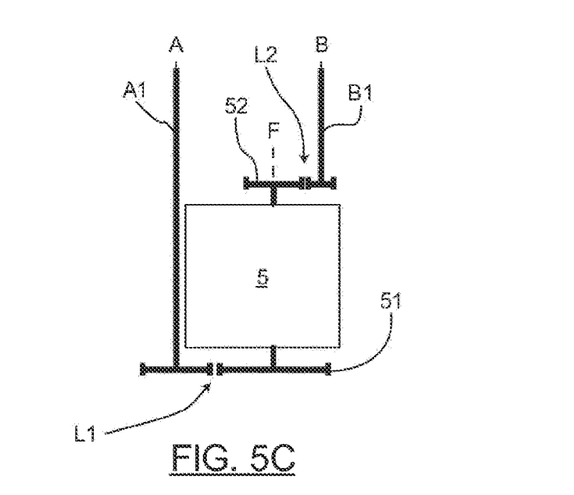

With reference to [FIG. 5C], the common braking device 5 comprises a braking axis F that is vertical and two braking members 51, 52 that extend projecting vertically downwards and upwards respectively. The first braking member 51 is directly connected to the first shaft A1 via a first gear connection L1. Similarly, the second braking member 52 is directly connected to the second shaft B1 via a second gear connection L2. Such an architecture has a reduced overall size and allows the two shafts A1, B1 to be braked similarly by increasing the reduction ratio. The distribution of the braking elements 51, 52 in an opposite manner advantageously allows the reduction ratio to be increased. The vertical space is thus optimally used.

Figure 5D:
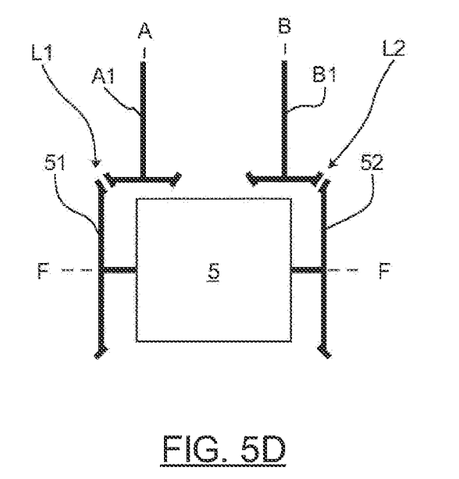

With reference to [FIG. 5D], the common braking device 5 comprises a braking axis F that is horizontal and two braking members 51, 52 that extend projecting horizontally to the left and to the right, respectively. The first braking member 51 is directly connected to the first shaft A1 via a first gear connection L1 with oblique teeth. Similarly, the second braking member 52 is directly connected to the second shaft B1 via a second gear connection L2 with oblique teeth. Such an architecture has a reduced overall size and allows the two shafts A1, B1 to be braked similarly. The horizontal space is thus optimally used.

Figure 5E:
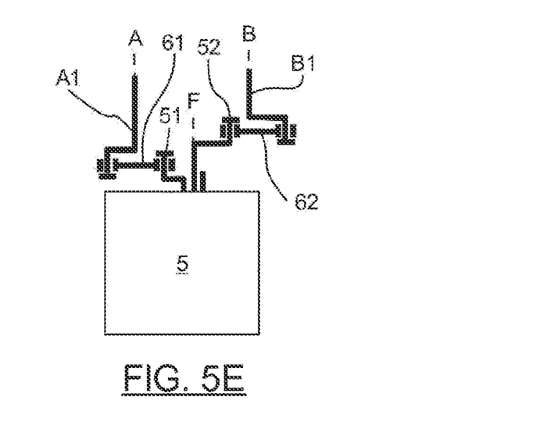

With reference to [FIG. 5E], the common braking device 5 comprises a braking axis F that is vertical and two braking members 51, 52 that extend projecting vertically upwards. The first braking member 51 is indirectly connected to the first shaft A1 via a first connecting rod 61. Similarly, the second braking member 52 is indirectly connected to the second shaft B1 via a second connecting rod 62. Such an architecture has a reduced overall size and allows the two shafts A1, B1 to be braked similarly. The use of connecting rods 61, 62 allows the reduction ratio to be increased non linearly. The reduction ratio can thus be optimally adjusted. Advantageously, the limited angular travel of each of the shafts A1, B1 (in the order of 120°) makes it possible to use connecting rods 61, 62 since a reduced sector of the circumference is covered by the braking members 51, 52. The axes of rotation of the ends of the connecting rods 61, 62 may be parallel or equipped with ball joints. Connecting rods 61, 62 allow for reduced friction compared to gear connections L1, L2.

Figure 5F:
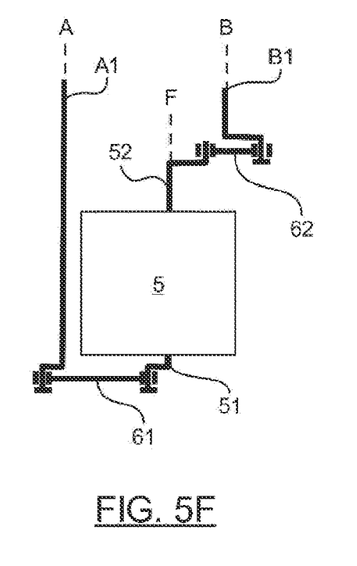

With reference to [FIG. 5F], the common braking device 5 comprises a braking axis F that is vertical and two braking members 51, 52 that extend projecting vertically downwards and upwards, respectively. The first braking member 51 is indirectly connected to the first shaft A1 via a first connecting rod 61. Similarly, the second braking member 52 is indirectly connected to the second shaft B1 via a second connecting rod 62. Such an architecture has a reduced overall size and allows the two shafts A1, B1 to be braked similarly. The vertical space is thus optimally used.

Figure 5G:
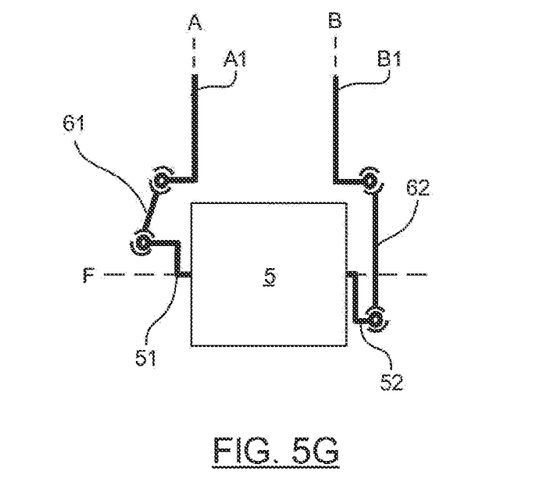
Figure 5H:
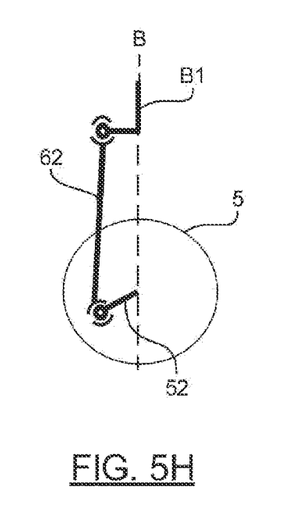

With reference to FIGS. 5G and 5H, the common braking device 5 comprises a braking axis F that is horizontal and two braking members 51, 52 that extend projecting horizontally to the left and to the right, respectively. The first braking member 51 is indirectly connected to the first shaft A1 via a first connecting rod 61, while the second braking member 52 is indirectly connected to the second shaft B1 via a second connecting rod 62. Such an architecture has a reduced overall size and allows the two shafts A1, B1 to be braked similarly. The horizontal space is thus optimally used. In this example, the axes of rotation of the ends of the connecting rods 61, 62 are equipped with ball joints.

Figure 5I:
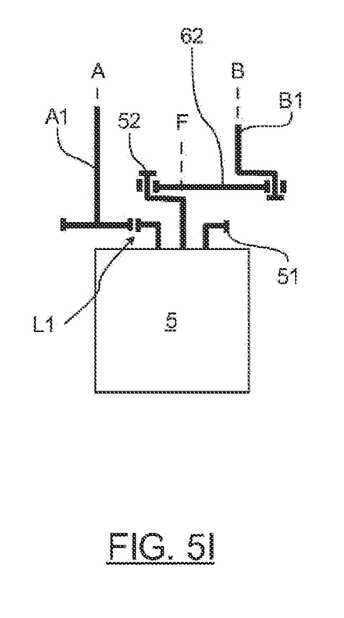
FIG. 5I are schematic representations of several architectures for connecting a common braking device to the shafts.

With reference to [FIG. 5I], the common braking device 5 comprises a braking axis F that is vertical and two braking members 51, 52 that extend projecting vertically upwards. The first braking member 51 is directly connected to the first shaft A1 via a first gear connection L1 while the second braking member 52 is indirectly connected to the second shaft B1 via a second connecting rod 62. Such an architecture has a reduced overall size and allows the two shafts A1, B1 to be braked similarly. The use of a gear connection and a connecting rod in the same architecture allows for precise adjustment of the reduction ratio through a combination of linear and non-linear modifications.

Preferably, for a travel of each shaft of approximately 120°, a reduction ratio of between 1 and 1.2 is optimal.

Direct or indirect integral connections with gears or connecting rods have been set forth and of course the various combinations can be contemplated by the skilled person.

Furthermore, a common braking device 5 has been set forth with a braking axis F parallel or orthogonal to the axes A, B of the shafts A1, B1, but of course the inclination of the braking axis F could be any inclination. The same applies to the axes A, B of the shafts A1, B1.

Thus, advantageously, the present invention makes it possible to adapt to the various design constraints of a control column M.

An example of the use of a control column M will now be set forth with reference to [FIG. 2].

When using the control column M in a nominal mode, the pilot freely manipulates the control lever 1 along the roll axis X and pitch axis Y, which rotatably drives the shafts A1, B1 via the mechanical joint 2. The angular position of the shafts A1, B1 is measured by the angular position sensors 41, 42 in order to transmit displacement commands COM to the aircraft's control members 9 (flaps, etc.).

The force feedback members 31, 32 are active so that the pilot perceives a force feedback at the control lever 1 on each of the roll axis X and pitch axis Y. The common braking device 5 is inactive and the braking members 51, 52 are free to rotate in the casing 50.

When the control column M is used in an emergency mode as a result of a malfunction, the force feedback members 31, 32 are inactive and the pilot does not perceive any force feedback at the control lever 1. The common braking device 5 is active and the braking members 51, 52 are no longer free to rotate in the casing 50. The braking device 50 imposes a reduction ratio on the shafts A1, B1 which significantly brakes the control lever 1. The control lever 1 is then firmly fixed in the position it was in when switching to emergency mode. The pilot thus immediately perceives that he is in an emergency flying mode.

The angular position sensors 41, 42 are no longer used to generate the flying instructions. Separate force sensors, present in the control lever 1 which has become fixed, make it possible to take over in emergency mode to transmit the displacement commands COM to the aircraft's control members 9 (control surfaces, etc.).

By virtue of the invention, the force application device D has a limited overall size and reduced mass and lower power consumption, greater reliability and optimal cost. Advantageously, the common braking device 5 makes it possible to act synergistically on the two shafts A1, B1 to brake them together in the emergency mode.

The invention claimed is:

1. A force application device for a control column for an aircraft, the control column comprising a first shaft, a second shaft and a control lever configured to rotatably drive the first shaft about a first axis and the second shaft about a second axis, the force application device comprising:
   a first force feedback member configured to exert a resistive force opposing the rotation of the first shaft about the first axis and
   a second force feedback member configured to exert a resistive force opposing the rotation of the second shaft about the second axis,
   a common braking device comprising a casing, a first braking member and a second braking member, and wherein at least part of the first and second braking members are coaxial and rotatably mounted in the casing and are configured to cooperate respectively with the first shaft and the second shaft so as to brake them, simultaneously.

2. The force application device according to claim 1, wherein the at least part of each braking member that is coaxial and rotatably mounted in the casing is a brake portion and each braking member has a drive portion projects from the casing.

3. The force application device according to claim 2, wherein the common braking device comprises a first volume and a second volume in which the brake portions of the first and second braking members are respectively mounted, each volume comprising a magnetorheological fluid having a shear strength that is variable as a function of a magnetic field applied to said magnetorheological fluid.

4. The force application device according to claim 1, wherein the first and second braking members respectively cooperate with the first and second shafts at a reduction ratio greater than 1.

5. The force application device according to claim 1, wherein the first braking member cooperates with the first shaft via a first gear connection.

6. The force application device according to claim 1, wherein the second braking member cooperates with the second shaft via a second gear connection.

7. The force application device according to claim 1, wherein the second braking member cooperates with the second shaft via a second connecting rod.

8. The force application device according to claim 1, wherein the first braking member cooperates with the first shaft via a first connecting rod.

9. The force application device according to claim 2, wherein the drive portions of the first and second braking members project from said casing in a same direction.

10. The force application device according to claim 2, wherein, the drive portions of the first and second braking members project from said casing in opposite directions.

11. A control column for an aircraft comprising a first shaft, a second shaft and a control lever configured to rotatably drive the first shaft about a first axis and the second shaft about the second axis, the control column comprising the force application device according to claim 1 connected to the first shaft and the second shaft.

12. A method for using the control column according to claim 11, wherein, in a nominal operating mode, the common braking device being inactive so as to allow free rotation of the first shaft and the second shaft, the method comprising a step of activating the common braking device in an emergency operating mode in which the common braking device brakes the first shaft and the second shaft, simultaneously.

13. A force application device for a control column for an aircraft, the control column comprising a first shaft, a second shaft and a control lever configured to rotatably drive the first shaft about a first axis and the second shaft about a second axis, the force application device comprising:
   a first force feedback member configured to exert a resistive force opposing the rotation of the first shaft about the first axis, and
   a second force feedback member configured to exert a resistive force opposing the rotation of the second shaft about the second axis,
   a common braking device comprising a casing, a first braking member, and a second braking member, the first and second braking members being coaxial and rotatably mounted with each braking member comprising a drive portion projecting from the casing and a brake portion mounted in the casing and wherein the first and second braking members are configured to cooperate respectively with the first shaft and the second shaft so as to brake them.

14. The force application device according to claim 13, wherein the first and second braking members respectively cooperate with the first and second shafts at a reduction ratio greater than 1.

15. The force application device according to claim 13, wherein the first braking member cooperates with the first shaft via a first gear connection and the second braking member cooperates with the second shaft via a second gear connection.

16. The force application device according to claim 13, wherein the second braking member cooperates with the second shaft via a second connecting rod and the first braking member cooperates with the first shaft via a first connecting rod.

17. The force application device according to claim 13, wherein the drive portions of the first and second braking members project from said casing in a same direction.

18. The force application device according to claim 13, wherein, the drive portions of the first and second braking members project from said casing in opposite directions.

19. A force application device for a control column for an aircraft, the control column comprising a first shaft, a second shaft and a control lever configured to rotatably drive the first shaft about a first axis and the second shaft about a second axis, the force application device comprising:

a first force feedback member configured to exert a resistive force opposing the rotation of the first shaft about the first axis, a second force feedback member configured to exert a resistive force opposing the rotation of the second shaft about the second axis, a common braking device comprising a casing, a first braking member, and a second braking member, wherein at least part of the first and second braking members are coaxial and rotatably mounted in the casing and are configured to cooperate respectively with the first shaft and the second shaft so as to brake them, and wherein the first braking member cooperates with the first shaft via a first gear connection and the second braking member cooperates with the second shaft via a second gear connection.

20. The force application device according to claim 19, wherein the first and second braking members respectively cooperate with the first and second shafts at a reduction ratio greater than 1.

* * * * *